April 3, 1956     R. J. RUBLE ET AL     2,740,900
RADIATION DETECTOR
Filed Aug. 22, 1952

INVENTORS
RAYMOND J. RUBLE
ARTHUR L. TIRICO
BY
J. H. Grahame
ATTORNEY

United States Patent Office 2,740,900
Patented Apr. 3, 1956

2,740,900

RADIATION DETECTOR

Raymond J. Ruble, Beacon, N. Y., and Arthur L. Tirico, Glen Ridge, N. J., assignors to Texaco Development Corporation, New York, N. Y., a corporation of Delaware Application August 22, 1952, Serial No. 305,758

12 Claims. (Cl. 250—83.6)

This invention relates to radiation detectors. More particularly it relates to detectors having better signal-to-noise ratios than scintillometers and capable of higher counting rates than Geiger-Mueller tubes.

As is known two of the principal types of radiation detectors which have been developed in the prior art are Geiger-Mueller tubes and scintillometers. In a Geiger-Mueller tube the radiation which is being measured directly provides one or more charged particles, e. g., electrons, either as a constituent component of the radiation itself or as a by-product of an interaction thereof, and gas amplification is used for translating the small number of these charged particles into a sizable avalanche of electrons adequate to constitute a usable electrical pulse. A disadvantage of this type of detector is that after each discharge, i. e., after each generation of an output pulse, the tube remains incapable of detecting another proton or quantum of radiation until de-ionization of its gaseous filling has occurred and its interelectrode capacitance has been recharged, this usually occurring relatively slowly over a large quenching resistor. Because of this the Geiger-Mueller tube has a certain minimum "dead time" and in accordance therewith, a certain maximum counting rate. While scintillometers are capable of more rapid counting, they, on the other hand, have a different disadvantage. As is known the operation of a scintillometer depends upon the emission of photo-electrons from a very low work function cathode in response to scintillations produced in a luminophor, i. e., in its radiation-responsive "detector head." These photo-electrons are then multiplied, usually by a cascade of secondary emitters, to so increase their number that they constitute a useful pulse. A disadvantage of these detectors is that the low work function cathode spuriously emits thermal electrons which, as multiplied in the multiplier cascade, can constitute very substantial and confusing back-ground "noise." This is particularly objectionable where the scintillometer must be used in high temperature ambients such as in logging a deep bore hole.

Accordingly it is an object of the present invention to devise a radiation detector which does not have the above-mentioned disadvantages.

In general these and other objects are attained by provision of a novel apparatus in which: (1) a photon or quantum of radiation provides one or more high energy charged particles in much the same way that it does so in a Geiger-Mueller tube, i. e., either as a constituent component of the radiation or as a by-product of an interaction thereof; (2) these high energy particles are translated into electrons of such low energy that they can easily be directed into the input electron-multiplier of a cascade thereof, the translation usually being accompanied by a significant numerical gain, e. g., one Compton electron provided by the interaction of a gamma may be translated into several secondary electrons; and (3) the low energy electrons are greatly multiplied in number over several stages of secondary-emitter electron multipliers. Thus there is provided an apparatus which neither utilizes the Townsend avalanche type of gas amplification with its unavoidable dead time or a low work function photo-emitter with its undesirable thermal noise.

Figure 1:
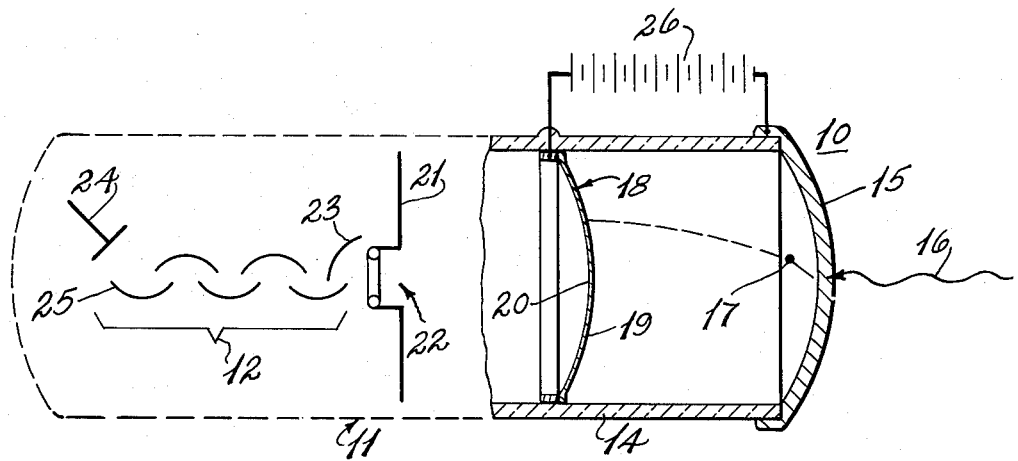
Fig. 1 shows an embodiment of the present invention with a portion thereof represented structurally and in longitudinal cross-section and the remainder represented schematically.

The detector 10 shown in Fig. 1 comprises an hermetically sealed envelope 11 which is adapted to receive on its right-hand end, as it appears in the drawing, impingement of the radiation to be measured, and which contains a cascade 12 of electron multipliers within its opposite end. As shown herein the side walls of the envelope 11 consist of a cylindrical insulating member 14, such as a length of glass or ceramic tubing, while its input endwall comprises a cap 15 which may be made of any of the various materials which are suitable for making the cathodes of Geiger-Mueller tubes, e. g., dense materials having high work functions. The thickness of the cap 15 should be selected in accordance with principles, the first two of which are well known in the art (see co-pending application Serial No. 284,615) to have a value which depends on such factors as (1) the density of the material of which it is made; (2) the penetration capabilities of the radiation to be measured; and (3) the extent to which it is desired to retard the charged-particle by-products of interactions. Of course, if the radiation to be measured either consists of high energy particles to begin with, as in the case of beta radiation, or comprises them as an actual component, then the cap 15 should serve as a window rather than an interaction element and, to this end, should be thin enough to permit entry of many of the particles into the interior of the envelope 11. On the other hand if the radiation to be measured is of a kind which can only produced charged-particle by-products by having interactions with specific kinds of materials, e. g., thermal neutrons can not produce alpha particles by being absorbed in many materials, but they can produce them by being absorbed in such materials as boron, lithium, etc., then the cap 15 should comprise said appropriate material, for example, by its being intermixed with the other material(s) of which the cap is comprised or by its being applied to the inside surface of the cap as a discrete layer.

To illustrate the operation of the detector 10 a gamma ray 16 is represented in Fig. 1 as sustaining an interaction in the cap 15 whereby a charged-particle by-product 17 is projected from the interaction point in an appropriate direction and for a sufficient distance for it to emerge from the inside surface of the cap 15 and into the interior of the envelope 11. As is known, when radiation is so converted the charged-particle by-product(s) will have kinetic energy in proportion to the energy of the initial radiation, e. g., a Compton electron produced by the interaction of the gamma ray may have kinetic energy corresponding to that of an electron which has "fallen" through a gradient of 100,000 volts. Because of this and because of the random directions with which the charged-particles will emerge from the inside surface of the cap 15 it would not be feasible directly to utilize these particles as bombarding electrons for the first dynode of the cascade of multipliers 12. Their random directions would cause most of them to miss the first dynode and therefore to be ineffectual for starting the generation of electrical pulses. As a result the efficiency with which the interactions occurring in the cap 15 could be converted into electrical pulses would be very low. Since a factor governing the overall efficiency of the counter is the product of the above-mentioned efficiency times the efficency with which the cap 15 can convert photons or quanta of radiation into escaped charged-particle by-products, and since this latter efficiency also is very low, the overall efficiency obtainable under such circumstances would be a very small fraction of one per cent. What is more, few if any of the high energy particles which might happen to strike the first dynode would be in the proper velocity range to result in a good secondary emission ratio. In fact most of them would probably simply penetrate the first dynode without producing any secondary emission from its bombarded surface. Accordingly, means are provided herein for converting high energy charged-particles which emerge from the inside surface of the cap 15 into low-energy easily-controlled electrons and to afford a significant numerical gain in doing so.

In the Fig. 1 embodiment this means comprises a secondary emitter membrane 18 mounted within envelope 11 in spaced and insulated relationship to the cap 15. As a result by establishing an appropriate electric field between these two elements, e. g. by connecting a source of direct potential 26 between them, a substantial percentage of the charged-particles which escape from the inside of the can have their directions of motion controlled so that they will impinge on a first surface 19 of the membrane 18 with sufficient force to project secondary electrons from its other (or "second") surface 20. Secondary emitters which are capable of this kind of operating are well known in certain of the electrical arts as exemplified by the aluminum foil 23 shown in Figs. 2 and 4 of U. S. Patent 2,584,814. Of course it is true that some of the escaped charged-particle by-products will have such extremely high velocities that no economically available magnitudes of electric field between the membrane 18 and the cap 15 will be capable of exerting much influence on them. However, it is also true that many of them may be sufficiently retarded in forcing their way through the dense material of the cap from their points of origin (interaction points) to its inside surface, to have greatly reduced energies at which they can be very effectively influenced by a field of the order of, say, ten thousand volts. Therefore, by using an appropriately thick cap 15 for radiation of a given penetration capability, the first surface 19 can be caused to be bombarded by a very substantial percentage of the charged-particles which escape into the interior of the envelope 11. Moreover, the velocities of these particles may be distributed over quite a wide range without adversely affecting the operation of the detector. One significant and useful characteristic of secondary emitter membranes such as the membrane 18 is that their responsiveness to primary bombardment is not critical as to the energies of the particles with which the bombardment is effected. Another is that despite this the secondary electrons which are emitted from its second surface will all have initial velocities in a low and a rather narrow range such as from a few tenths of a volt to a few volts. As a result the secondary electrons which issue from the second surface 20 will have energies and directions very similar to the energies and directions of the photo-electrons emitted from the cathode of a photomultiplier tube. Because of this all of the structure of the detector 10 which faces the surface 20 may be similar to that which faces the inside surface of the cathode of a "head-on" photomultipler tube such as the RCA 5819 (see the structure shown to the right of the photo cathode in Fig. 4A on page 529 in the RCA Review of December 1949 in the article "Photo Multipliers for Scintillation Counters" by George Morton.

The structure in question comprises: (1) the cascade 12 of electron multipliers, already mentioned above; (2) an accelerating-electrodes assembly 21, which, in the operation of the device, is polarized at a potential about 100 volts more positive than the membrane 18 to provide an electron optic for accelerating and focusing any secondary electrons which are emitted from the surface 20 to project them through a central opening 22 in the assembly 21 and onto the first dynode 23 of the cascade 12; and (3) a collector electrode 24 for receiving the electrons emitted by the last dynode 25 of the cascade 12. A source of direct potential 26 is connected between the cap 15 and the membrane 18 to provide the required particle-controlling field of, as mentioned above, some thousands of volts.

If desired a low pressure ionizable gaseous filling may be utilized in the enclosed portion of the envelope 11 between the cap 15 and the membrane 18 as a means for converting more of the high energy particles emitted from the inside surface of the cap 15 into easily-controlled low-energy electrons and of simultaneously achieving gain in the number of the latter as compared to the number of the former. The distance from the cap 15 to the membrane 18 should be great enough and the ionizable gas should be at a sufficiently low pressure so that, according to well known principles governing the behavior of gas-filled devices, e. g. Paschen's law, a continuous gaseous discharge will not be established and maintained as soon as any average free electron is accelerated through the gas from the inside surface of cap 15 to the surface 19 over the relatively large-magnitude electric field required for sufficiently accelerating the bombarding electrons so that they can produce secondary emission from the second-surface 20. Despite this, the charged-particle by-products of interactions, in-as-much-as they usually will have extremely high energies independently of the field between the cap 15 and the membrane 18, and will have them as soon as they emerge from the cap 15 (whereas any free electrons produced by ionization will have substantially zero initial velocities and will never attain terminal velocities any higher than a maximum one corresponding to the voltage of the positive pole of the source 26) will be entirely capable of leaving along their paths trails of ionized gas atoms and free electrons. Thus in effect an individual high energy particle will be able to convert itself into a plurality of low energy electrons. The use of gas in the Figure 1 embodiment, and therefore the attainment of two translations of particles which have relatively high energies of thousands of volts into low energy electrons, will greatly increase its efficiency for two reasons: (1) because more of the original high energy charged-particles will result in primary bombardment of the membrane 18 and (2) because the bombardment resulting from each particle will be effected by a plurality of primary electrons. Due to the latter one of these two factors the secondary emission from the surface 20 for any single photon or quantum of the radiation impinging on the cap 15 will be greatly increased and the likelihood that a pulse can be lost in the multiplication of these secondary electrons at the first dynode 23 will be greatly reduced.

If it is desired to use a type of and/or pressure for the gaseous filling which can result in a continuous breakdown between the cap 15 and the membrane 18 then it will be advisable to use an electronic switch which opens the circuit of the source 26 immediately after the onset of each pulse in the output provided from the collector 24. This is to say, it may be desirable to use an electronic form of quench circuit. Even where quenching is needed the action of such a detector can be faster than that of a Geiger-Mueller tube since the gas diode action between the cap 15 and the membrane 18, unlike that in a Geiger-Mueller tube, will not entail, at the culmination of each detection event, the accumulation of a dense positive ion sheath which shields all of the electron-collecting surface of the positively polarized electrode and must diffuse away from it before another detection event can occur. Attention is called to the fact that the detector 10 can comprise, as shown herein, a gas filled section which is electron-coupled to an evacuated section and that this is possible inasmuch as the membrane 18 may be made of a suitable material and of a suitable thickness to have the secondary emission characteristics described above, and at the same time to serve as a barrier which, like a "Lenard Window," is impermeable to gas atoms and molecules. While no reinforcing grid or other structure is shown to buttress the relatively large second surface 20 so that the membrane 18 will not be burst by the pressure of the gaseous filling, it is to be understood that where necessary such reinforcement may readily be added. However, inasmuch as pressures which are suitable for the gaseous filling will be very low, the membrane 18 will not be subjected to much mechanical force.

Figure 2:
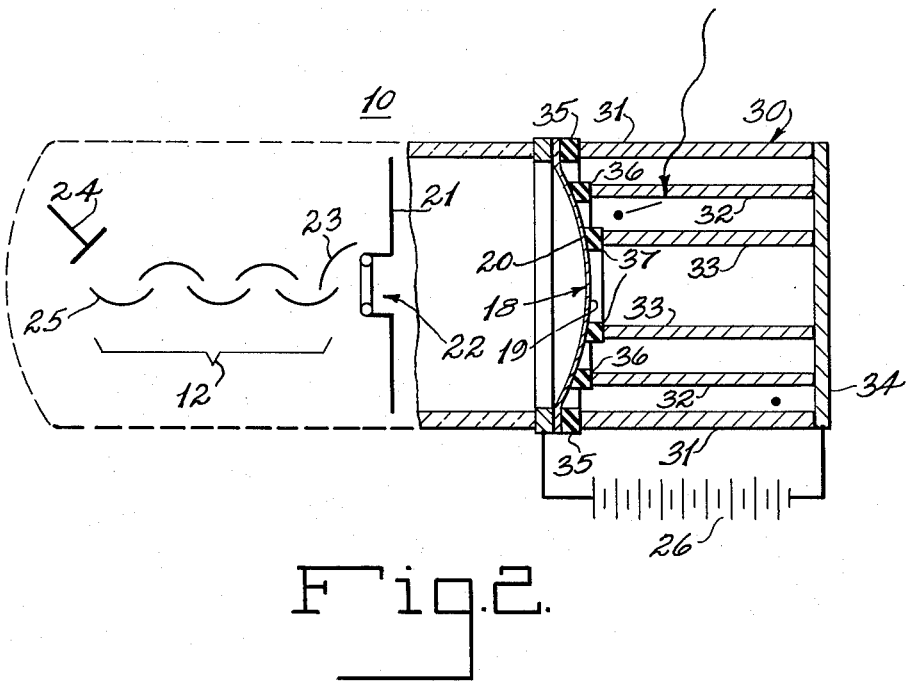
Fig. 2 shows another embodiment having portions which correspond to those of Fig. 1 and are similarly represented.

The embodiment of Fig. 2 is a modification of that of Fig. 1 in that its single interaction element, i. e., the cap 15, is replaced by an array (30) comprising a plurality of interaction elements which, in this particular example are concentric to one another. For reasons which are fully set forth in the co-pending application of Arthur L. Tirico, Serial No. 278,993, filed March 26, 1952, the array 30 will be capable of converting radiation, such as gamma rays, into usable charged-particle by-products, with much higher efficiency that a simple single interaction element like the cap 15 and, moreover, with particularly high efficiencies in cases of side-impinging radiation as distinguished from end-impinging radiation.

The array 30 comprises a number of concentric cylindrical interaction elements 31, an end plate 34, and a respective insulating ring (35, 36, 37) for the end of each of the cylindrical elements which is adjacent the first surface 19 of the membrane 18. The insulating rings 35—37 may be made of any of a number of insulating materials, such as glasses or ceramics, which are suitable for being glazed and/or soldered to metal to serve as sealing and supporting structures between the left end of the array 30 and the membrane 18.

Obviously many modifications and variations of the invention as hereinbefore set forth may be made without departing from the original spirit and scope thereof, and therefore only such limitations should be imposed as are indicated in the appended claims.

We claim:

1. Radiation detection apparatus comprising a membraneous, secondary-emitter element having two oppositely-facing exposed surfaces which is adapted to emit low energy electrons from one of said surfaces in response to bombardment of its opposite surface with high-energy charged-particles, means responsive to penetrative radiation to bombard said opposite surface of said element with high-energy charged-particles, a cascade of secondary-emitter electron-multipliers and means for projecting into the input of said cascade low energy electrons emitted from said first-mentioned surface of said element.

2. Apparatus as in claim 1 in which said first-mentioned means comprises an interaction element for absorbing penetrative radiation in interactions producing high-energy charged-particle by-products and means for influencing the movement of said charged-particle by-products to cause a significant number thereof to bombard said opposite surface of said element.

3. Apparatus as in claim 1 in which said first-mentioned means comprises an interaction element for absorbing penetrative radiation in interactions producing high-energy charged-particle by-products and means for accelerating in a region between said interaction element and said membraneous element electrons derived from interactions of radiation absorbed in said interaction element to bombard said opposite surface of the membraneous element therewith.

4. Apparatus as in claim 3 in which said accelerating means comprises terminal means connectable to a source of potential to establish between said membraneous and interaction elements an electric field capable of raising to high-levels the low kinetic energies of secondary electrons released by ionization of gas, and an ionizable gas between said membraneous interaction elements.

5. Radiation detection apparatus comprising an hermetically sealed envelope, a membraneous element separating a first part of the space contained within said envelope from the rest thereof, a filling of ionizable gas within said first part of said space, said membraneous element being impermeable to elementary particles constituting said gas, such as to atoms or molecules thereof, and responsive to bombardment with high-energy charged particles on the one of its surfaces which is adjacent said gas to emit low-energy electrons from its opposite surface, an interaction element responsive to penetrative radiation to project charged-particle by-products into said gas, terminal means connectable to a source of potential to establish an electric field for accelerating free electrons through said gas filling toward the membraneous element, a cascade of secondary-emitter electron-multipliers within said envelope on the opposite side of said membraneous element from said first part of the contained space, and electron-optical means for projecting into the input of said cascade low-energy electrons emitted from said membraneous element.

6. Radiation detection apparatus comprising: an hermetically sealed envelope; a membraneous element separating a first part of the space contained within said envelope from the rest thereof; a filling of ionizable gas within said first part of said space, said membraneous element being impermeable to elementary particles constituting said gas, such as to atoms or molecules thereof, and responsive to bombardment with high-energy charged-particles on one of its surfaces which is adjacent to said gas to emit low-energy electrons from its opposite surface; an array of spaced-apart interaction elements at least a portion of which is contained within said first part of said space, with the gas occupying its interelement spaces, and is responsive to penetrative radiation to project charged-particle by-products into said gas; terminal means connectable to a source of potential to establish an electric field for accelerating free electrons through interelement spaces within the array toward the first-mentioned surface of said membraneous element, a cascade of secondary-emitter electron-multipliers within said envelope on said opposite side of said membraneous element, and electron-optical means for projecting into the input of said cascade low-energy electrons emitted from said membraneous element.

7. The method of detecting radiation comprising the steps of: intercepting radiation to derive high-energy charged-particles therefrom, directly converting the charged-particles into low-energy electrons, and producing an electrical signal of usable magnitude by repeated secondary-emission-multiplication of the low-energy electrons.

8. The method of detecting radiation comprising the steps of: absorbing radiation to produce high-energy charged-particles as by-products of interactions thereof, utilizing the high-energy particles to produce free electrons from atoms of an ionizable gas, accelerating the free electrons to high-energy levels, converting the accelerated free electrons into low-energy second-surface-emitted secondary electrons, and producing an electrical signal of usable magnitude by repeated secondary-emission-multiplication of the low-energy electrons.

9. Radiation detection apparatus comprising an hermetically sealed envelope, a membraneous type of secondary emitter dividing the space within the envelope into discreet portions hermetically isolated from one another, a filling of ionizable gas in a portion of the space within the envelope on one side of said emitter, a cascade of secondary-emitter electron-multipliers positioned within the envelope on the opposite side of said emitter to receive on its first multiplier electrode low-energy electrons emitted therefrom.

10. Apparatus as in claim 9 in which said emitter comprises a thin membrane of aluminum.

11. A subassembly for an electrical apparatus comprising a membraneous secondary-emitter, a closure which includes said emitter as one of its walls and is adapted to contain a quantity of gas in juxtaposition to the emitter, an ionizable gaseous filling within the closure, and means responsive to the impingement of radiation on the subassembly to project high-energy charged-particles into said filling.

12. Electrical apparatus comprising an hermetic closure, a wall of said closure being adapted to respond to impingement of high energy electrons on its inside surface to produce a predetermined useful effect, an ionizable gas within the closure, an interaction means responsive to the impingement of radiation to project high-energy charged-particles into said gas, and terminal means connectable to a source of potential to provide between said wall and said interaction means an electric field of sufficient magnitude to accelerate low-energy electrons toward said surface and to high-energy levels, the gas being at too low a pressure to sustain a continuous discharge even when a field of such magnitude is provided between the wall and the interaction means.

References Cited in the file of this patent
UNITED STATES PATENTS

| | | |
|---|---|---|
| 2,521,133 | Snell | Sept. 5, 1950 |
| 2,551,576 | Bailey | May 8, 1951 |
| 2,612,610 | Marshall et al. | Sept. 30, 1951 |
| 2,616,052 | Hurst | Oct. 28, 1952 |
| 2,643,343 | Rainwater | June 23, 1953 |